US 12,341,383 B2

(12) United States Patent
Hayashi

(10) Patent No.: US 12,341,383 B2
(45) Date of Patent: Jun. 24, 2025

(54) ROTOR

(71) Applicant: TOYOTA JIDOSHA KABUSHIKI KAISHA, Toyota (JP)

(72) Inventor: Kenichiro Hayashi, Ohbu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 196 days.

(21) Appl. No.: 18/142,683

(22) Filed: May 3, 2023

(65) Prior Publication Data

US 2024/0006940 A1 Jan. 4, 2024

(30) Foreign Application Priority Data

Jun. 29, 2022 (JP) ................. 2022-104924

(51) Int. Cl.
H02K 1/28 (2006.01)
H02K 7/00 (2006.01)

(52) U.S. Cl.
CPC ............... H02K 1/28 (2013.01); H02K 7/003 (2013.01)

(58) Field of Classification Search
CPC ........... H02K 1/28; H02K 7/003; H02K 1/278
See application file for complete search history.

(56) References Cited

U.S. PATENT DOCUMENTS

2020/0412191 A1* 12/2020 Inuzuka ................. H02K 1/276

FOREIGN PATENT DOCUMENTS

| JP | 59-145248 U | 9/1984 |
| JP | 2001-025195 A | 1/2001 |
| JP | 2015-104176 A | 6/2015 |
| JP | 2021078241 A * | 5/2021 |
| WO | 2019/171099 A1 | 9/2019 |

OTHER PUBLICATIONS

English Translation of Japanese communication dated Oct. 8, 2024 in Japanese Application No. 2022-104924.

* cited by examiner

Primary Examiner — Thomas Truong
(74) Attorney, Agent, or Firm — Sughrue Mion, PLLC

(57) ABSTRACT

A rotor includes a rotor core provided with a through hole, and a shaft fitted into the through hole. The shaft includes an arc-shaped outer peripheral portion extending along a center of the through hole, and a flat surface portion linearly cutting out at least part of a circle of the outer peripheral portion in a section orthogonal to an extending direction of the center. The through hole of the rotor core includes an inner peripheral portion that faces and is separated from the outer peripheral portion and the flat surface portion to provide a space portion, a first contact portion that is provided in the inner peripheral portion directed toward the center and contacts the flat surface portion, and second contact portions that are provided in the inner peripheral portion directed toward the center at positions away from the first contact portion and contact the outer peripheral portion.

3 Claims, 5 Drawing Sheets

ROTOR

CROSS-REFERENCE TO RELATED APPLICATION

This application claims priority to Japanese Patent Application No. 2022-104924 filed on Jun. 29, 2022, incorporated herein by reference in its entirety.

BACKGROUND

1. Technical Field

The present disclosure relates to a rotor.

2. Description of Related Art

In a motor, a rotor in which a shaft is disposed in a through hole of a rotor core is known. Some measures have been proposed to suppress deterioration of characteristics of the motor in the case of fitting the rotor core and the shaft together.

For example, a technique related to a rotary electric machine rotor provided with a rotor core including a center hole into which a shaft provided with a key groove on the outer peripheral side is inserted, and a key portion that protrudes further toward the inner diameter side than an inner diameter of the center hole and fits into a key groove is disclosed (Japanese Unexamined Patent Application Publication No. 2015-104176 (JP 2015-104176 A)).

SUMMARY

However, when the key groove is used to stop the rotation, it is difficult to keep the design tolerance of the key groove portion, and there is a possibility that the accuracy may be lowered due to processing variations. Further, when the processing variations become large, there is a possibility that the quality of the rotor is degraded and the characteristics of the motor is degraded as a result.

The present disclosure has been made to solve such problems, and provides a rotor that suppresses deterioration in quality.

A rotor according to the present disclosure includes a rotor core provided with a through hole, and a shaft fitted into the through hole. The shaft includes an arc-shaped outer peripheral portion extending along a center of the through hole, and a flat surface portion linearly cutting out at least part of a circle of the outer peripheral portion in a section orthogonal to an extending direction of the center. The through hole of the rotor core includes an inner peripheral portion that faces and is separated from the outer peripheral portion and the flat surface portion to provide a space portion, at least one first contact portion that is provided in the inner peripheral portion and directed toward the center and contacts the flat surface portion, and two or more second contact portions that are provided in the inner peripheral portion and directed toward the center at positions away from the first contact portion and contact the outer peripheral portion.

With the above configuration, the rotor core and the shaft are fitted with high accuracy by the first contact portion and the second contact portions.

In the rotor above, the rotor core includes the first contact portion and the second contact portions at respective positions symmetrical with respect to a first reference plane that is orthogonal to the flat surface portion and extends through the center, and a second reference plane extending through the center and being orthogonal to the first reference plane between the first contact portion and the second contact portions. With the above, the rotor core and the shaft are fitted with good balance.

Further, the rotor core may include the first contact portions at two locations across the first reference plane. With the above, the rotor core and the shaft are fitted with good balance.

Further, the rotor core may include the inner peripheral portion, the first contact portion, and the second contact portions at least in respective end portions of the through hole, and includes a portion separated from an entire circumference of the shaft in an intermediate portion. With the above, the rotor core and the shaft of the rotor are reliably fitted.

Further, in the rotor above, the shaft preferably has a rotationally symmetrical shape with respect to the center. With the above, the rotor can suppress the deterioration of the rotation balance.

According to the present disclosure, a rotor that suppresses deterioration in quality is provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, the present disclosure will be described through embodiments of the disclosure. However, the disclosure according to the scope of claims is not limited to the following embodiments. Moreover, not all the configurations described in the embodiments are essential as means for solving the problems. For clarity of explanation, the following descriptions and drawings are omitted and simplified as appropriate. In addition, in each drawing, the same elements are denoted by the same reference signs, and redundant description is omitted as necessary.

First Embodiment

Figure 1:
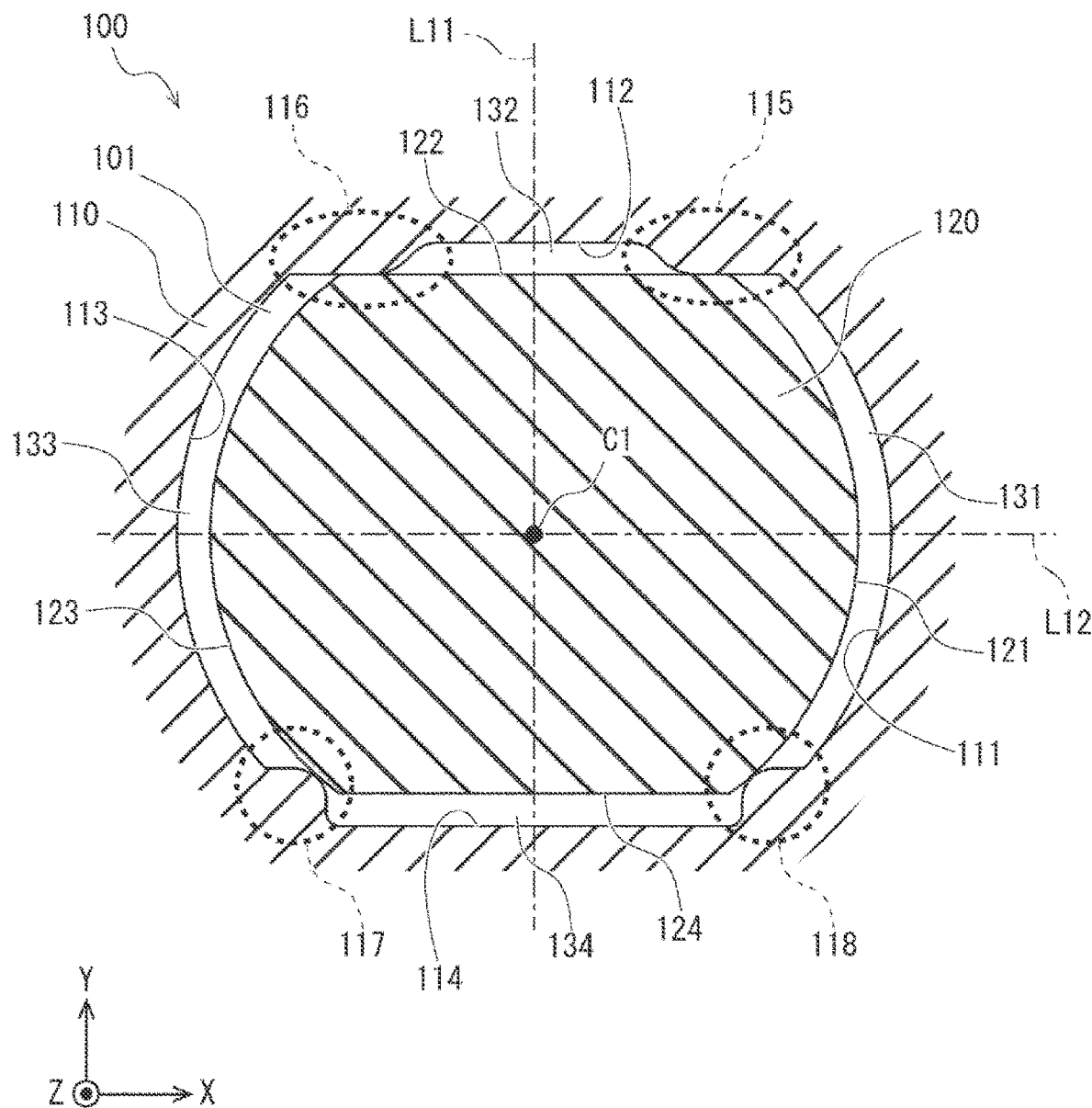
FIG. 1 is a configuration diagram of a rotor according to a first embodiment.

Embodiments of the present disclosure will be described below with reference to the drawings. FIG. 1 is a configuration diagram of a rotor 100 according to the first embodiment. The rotor 100 is a rotor of a three-phase alternating-current (AC) motor. That is, the three-phase AC motor includes, for example, a stator provided with coils on its outer circumference and the rotor 100 inside the stator. The rotor 100 rotates when current flows through the stator. Further, the rotor 100 includes a shaft as described later, and the rotation of the rotor 100 is output through the shaft. The rotor 100 includes a rotor core 110 and a shaft 120 as main components.

It should be noted that FIG. 1 is provided with a right-handed orthogonal coordinate system for convenience in explaining the positional relationship of the constituent elements. Further, when the orthogonal coordinate system is attached in FIG. 2 and thereafter, the X-axis, Y-axis and Z-axis directions in FIG. 1 and the X-axis, Y-axis and Z-axis directions of the orthogonal coordinate systems in FIG. 2 and thereafter are respectively coincident.

FIG. 1 shows a section orthogonal to a rotation center C1 of the rotor 100. That is, the rotation center C1 shown in FIG. 1 can also be said to be a center line extending in the perpendicular direction (Z-axis direction) in FIG. 1. The rotor 100 has a shape extending along the rotation center C1. The rotation center C1 can also be said to be the center of the rotor core 110 or the center of a through hole 101. The rotation center C1 can also be said to be the center of the shaft 120.

The rotor core 110 is formed, for example, by layering plate-shaped magnetic bodies along the extending direction of the rotation center C1. Each plate-shaped magnetic body is, for example, an electromagnetic steel sheet containing iron as a main component. The rotor core 110 may also include a magnet on its outside. The rotor core 110 includes the through hole 101. The through hole 101 receives the shaft 120 to be inserted therethrough. Further, the through hole 101 supports the inserted shaft 120 without backlash by "tight fit".

The through hole 101 of the rotor core 110 includes an inner peripheral portion 111, an inner peripheral portion 112, an inner peripheral portion 113, and an inner peripheral portion 114 that define predetermined space portions with the shaft 120. The through hole 101 further includes a first contact portion 115, a first contact portion 116, a second contact portion 117, and a second contact portion 118 that are provided in the above inner peripheral portion 111, the inner peripheral portion 112, the inner peripheral portion 113, and the inner peripheral portion 114 to be directed toward the rotation center C1. That is, the through hole 101 is a space surrounded by the multiple inner peripheral portions, the first contact portions, and the second contact portions.

The first contact portion 115 and the first contact portion 116 are portions provided toward the center from the inner peripheral portion 111, the inner peripheral portion 112, and the inner peripheral portion 113 and contact a flat surface portion 122 of the shaft 120. The first contact portion 115 according to the present embodiment is in contact with the right end of the flat surface portion 122 extending in the right-left direction (the X-axis direction) in the drawing. On the other hand, the first contact portion 116 is in contact with the left end of the flat surface portion 122.

The second contact portion 117 is a portion provided between the inner peripheral portion 113 and the inner peripheral portion 114 to be directed toward the rotation center C1 at a position away from the first contact portion 115 and the first contact portion 116. The second contact portion 117 contacts an outer peripheral portion 123 of the shaft 120. The second contact portion 118 is a portion provided between the inner peripheral portion 111 and the inner peripheral portion 114 to be directed toward the rotation center C1 at a position away from the first contact portion 115 and the first contact portion 116. The second contact portion 118 contacts an outer peripheral portion 121 of the shaft 120.

The shaft 120 is a rod-shaped member that extends along the extending direction of the rotation center C1 that is the center of the through hole 101. In the section shown in FIG. 1, the shaft 120 includes the outer peripheral portion 121, the flat surface portion 122, the outer peripheral portion 123, and the flat surface portion 124. That is, the outer shape of the shaft 120 is defined by the outer peripheral portion 121, the flat surface portion 122, the outer peripheral portion 123, and the flat surface portion 124.

The outer peripheral portion 121 and the outer peripheral portion 123 are arc-shaped portions centered on the rotation center C1. The flat surface portion 122 and the flat surface portion 124 each have a shape in which at least a part of the circle of the outer peripheral portion is cut out linearly in a section orthogonal to the rotation center C1 (that is, the XY plane). The flat surface portion 122 in the present embodiment extends in the right-left direction so as to cut out an arc formed by the outer peripheral portion 121 and the outer peripheral portion 123 in an upper portion of the shaft 120 in FIG. 1. The flat surface portion 124 in the present embodiment extends in the right-left direction so as to cut out an arc formed by the outer peripheral portion 121 and the outer peripheral portion 123 in a lower portion of the shaft 120 in FIG. 1. That is, the flat surface portion 122 and the flat surface portion 124 each have parallel planes.

With the configuration described above, the rotor 100 includes a space portion 131 between the inner peripheral portion 111 and the outer peripheral portion 121 that are separated from each other and face each other. Similarly, the rotor 100 includes a space portion 132 between the inner peripheral portion 112 and the flat surface portion 122, a space portion 133 between the inner peripheral portion 113 and the outer peripheral portion 123, and a space portion 134 between the inner peripheral portion 114 and the flat surface portion 124.

The configuration of the rotor 100 has been described above. As described above, the first contact portion 115 of the rotor core 110 contacts the right end of the flat surface portion 122 of the shaft 120. Further, the first contact portion 116 contacts the left end of the flat surface portion 122 of the shaft 120. Further, the second contact portion 117 contacts the outer peripheral portion 123 on the lower left side of the shaft 120 in FIG. 1. Still further, the second contact portion 118 contacts with the outer peripheral portion 121 on the lower right side of the shaft 120 in FIG. 1. With the above configuration, the rotor core 110 and the shaft 120 are fitted with high accuracy by the first contact portions and the second contact portions.

The positional relationship among the first contact portion 115, the first contact portion 116, the second contact portion 117 and the second contact portion 118 will be described. In the rotor 100, the rotor core 110 includes the first contact portion 115 and the first contact portion 116 at positions symmetrical with respect to a first reference plane L11 that is orthogonal to the flat surface portion 122 and extends through the rotation center C1. Similarly, the rotor core 110 includes the second contact portion 117 and the second contact portion 118 at positions symmetrical with respect to the above-described first reference plane L11.

Further, the rotor 100 includes a second reference plane L12 between the first contact portions 115, 116 and the second contact portions 117, 118. The second reference plane L12 is a plane extending through the rotation center C1 and orthogonal to the first reference plane L11. In other words, the first contact portions 115, 116, and the second contact portions 117, 118 are disposed so as to interpose the second reference plane L12. With the configuration described above, the rotor core 110 and the shaft 120 are fitted with good balance.

It should be noted that, more preferably, for example, the first contact portion 115 and the second contact portion 117 are positioned to oppose to each other across the rotation center C1. Similarly, the first contact portion 116 and the second contact portion 118 are preferably positioned to oppose to each other across the rotation center C1.

Figure 2:
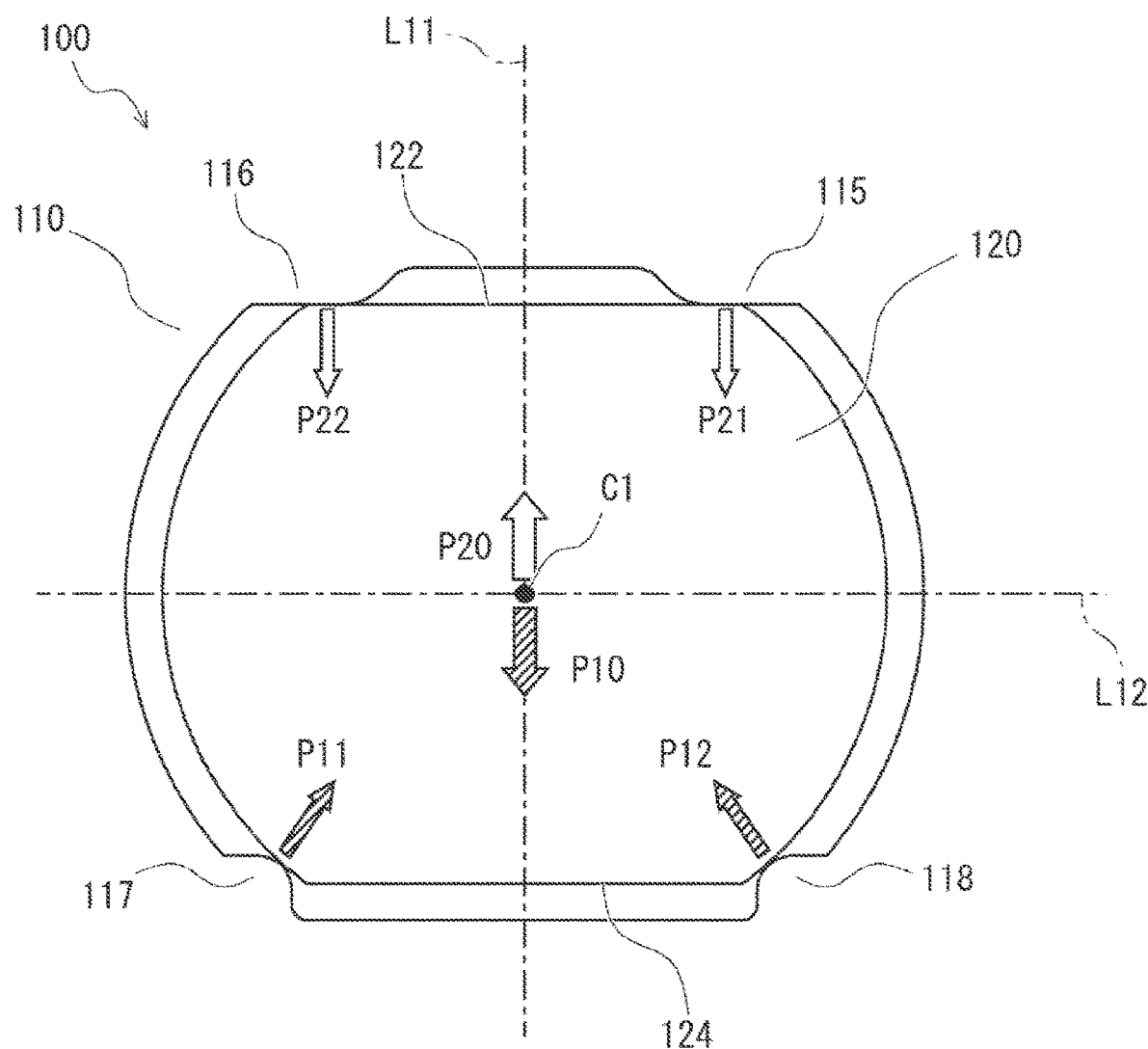
FIG. 2 is a first diagram showing the principle by which a rotor core holds a shaft.

Next, the principle by which the rotor core 110 holds the shaft 120 will be described with reference to FIG. 2. FIG. 2 is a first diagram showing the principle by which the rotor core 110 holds the shaft 120. FIG. 2 shows how the rotor core 110 holds the shaft 120 when an external force is applied to the shaft 120 in the Y-axis direction.

The downward (the negative Y-axis direction) arrow shown near the rotation center C1 in FIG. 2 is an external force P10 that the shaft 120 receives. When the shaft 120 receives the external force P10, the shaft 120 receives a reaction force P11 directed in a direction from the second contact portion 117 toward the rotation center C1 (in the upper right direction), and also receives a reaction force P12 directed in a direction from the second contact portion 118 toward the rotation center C1 (in the upper left direction). At this time, the forces in the lateral direction (the X-axis direction) in the reaction force P11 and the reaction force P12 cancel each other out. In addition, the forces in the upward direction (the Y-axis positive direction) in the reaction force P11 and the reaction force P12 are canceled out with the external force P10. Therefore, the rotor core 110 holds the shaft 120 when the shaft 120 receives the external force P10.

The upward (positive Y-axis direction) arrow shown near the rotation center C1 in FIG. 2 is an external force P20 that the shaft 120 receives. When the shaft 120 receives the external force P20, the shaft 120 receives a downward (the negative Y-axis direction) reaction force P21 from the first contact portion 115, and also receives a downward (the negative Y-axis direction) reaction force P22 from the first contact portion 116. At this time, the downward forces in the reaction force P21 and the reaction force P22 cancel out the external force P20. Therefore, the rotor core 110 holds the shaft 120 when the shaft 120 receives the external force P20.

Figure 3:
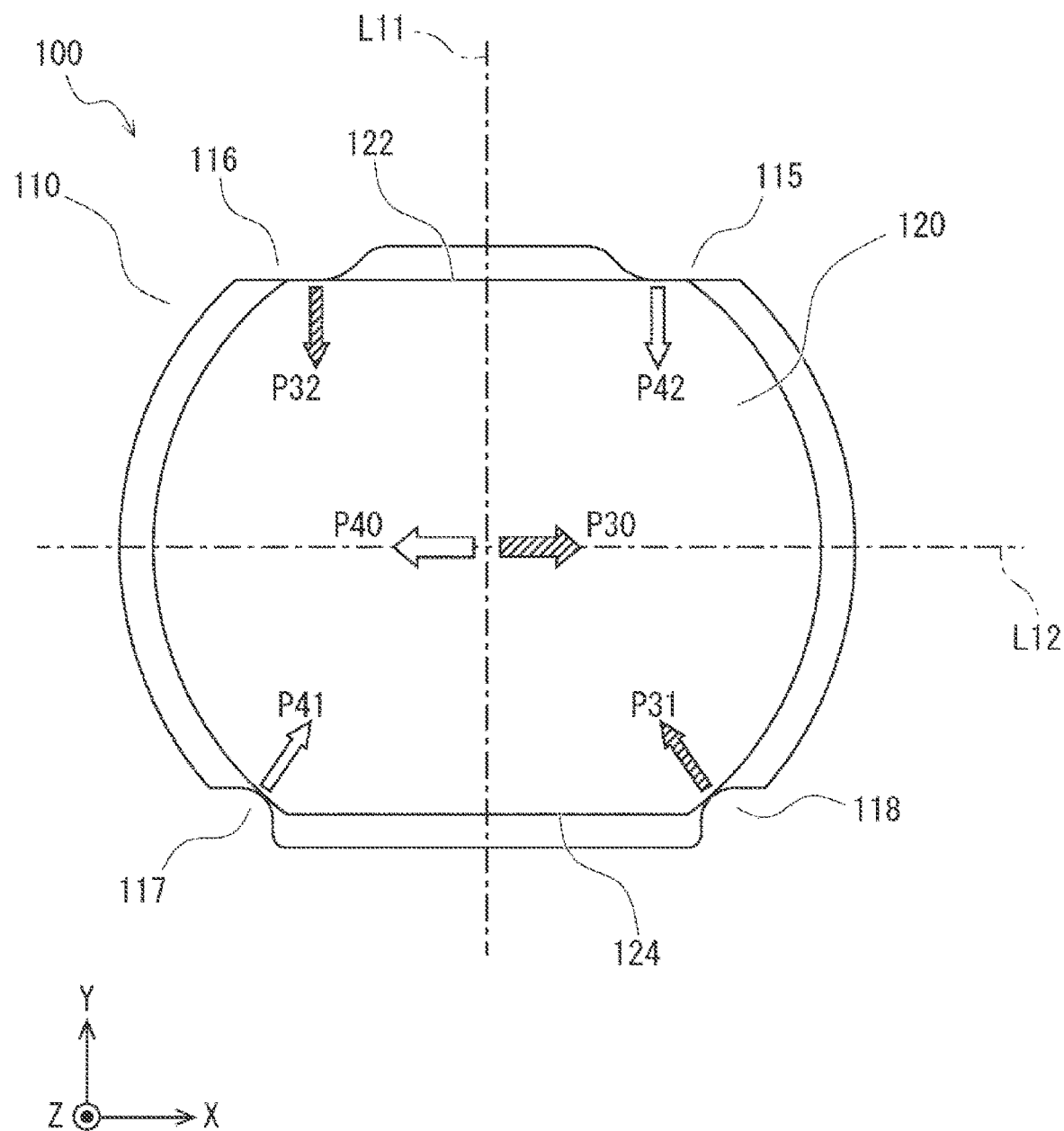
FIG. 3 is a second diagram showing the principle by which the rotor core holds the shaft.

Next, the principle by which the rotor core 110 holds the shaft 120 will be further described with reference to FIG. 3. FIG. 3 is a second diagram showing the principle by which the rotor core 110 holds the shaft 120. FIG. 3 shows how the rotor core 110 holds the shaft 120 when an external force is applied to the shaft 120 in the X-axis direction.

In FIG. 3, when the shaft 120 receives an external force P30 in the right direction (the positive X-axis direction), the shaft 120 receives a reaction force P31 directed from the second contact portion 118 toward the rotation center C1. With the above, the shaft 120 receives a force that rotates clockwise about the second contact portion 118 as a supporting point and further receives a downward reaction force P32 in the first contact portion 116. As a result, a force in the right-left direction is canceled out by the external force P30 and the reaction force P31, and a force in the up-down direction is canceled out by the reaction force P31 and the reaction force P32.

When the shaft 120 receives a leftward external force P40, a symmetrical relationship with respect to the first reference plane L11 is established as compared with the case where the shaft 120 receives the external force P30. That is, when the shaft 120 receives the external force P40, the second contact portion 117 receives a reaction force P41 directed toward the rotation center C1, and the first contact portion 115 receives a downward reaction force P42. Thus, the rotor core 110 holds the shaft 120 when the shaft 120 receives the lateral external force P30 or external force P40.

Figure 4:
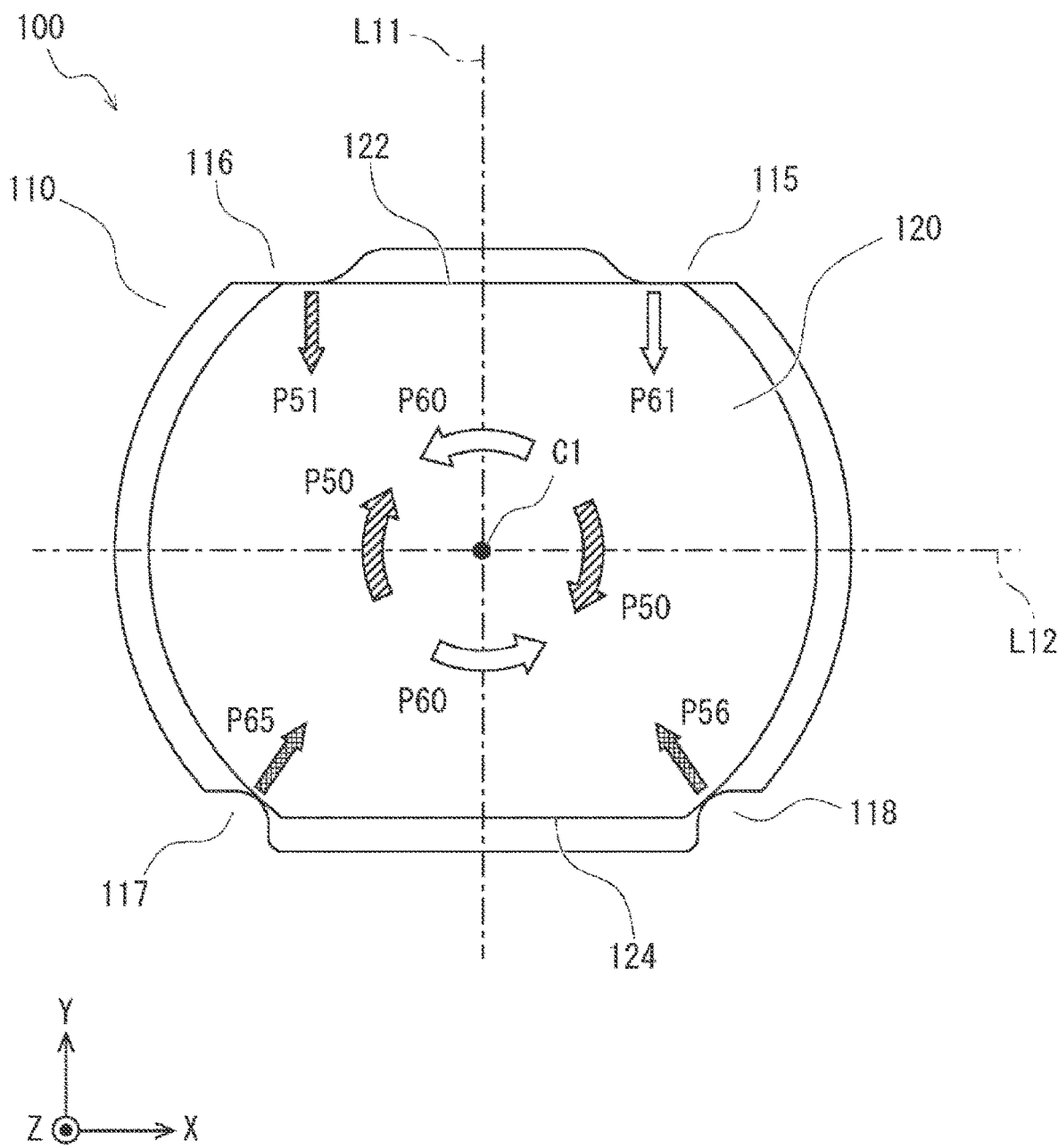
FIG. 4 is a third diagram showing the principle by which the rotor core holds the shaft.

Next, the principle by which the rotor core 110 holds the shaft 120 will be further described with reference to FIG. 4. FIG. 4 is a third diagram showing the principle by which the rotor core 110 holds the shaft 120. FIG. 4 shows how the rotor core 110 holds the shaft 120 when an external force is applied to the shaft 120 in a rotational direction.

In FIG. 4, when the shaft 120 receives a clockwise external force P50, the shaft 120 receives a downward reaction force P51 in the first contact portion 116. Further, the shaft 120 receives a reaction force P65 directed toward the rotation center C1 in the second contact portion 117 and a reaction force P56 directed toward the rotation center C1 in the second contact portion 118. The shaft 120 is held by the rotor core 110 by canceling out these forces.

Further, when the shaft 120 receives a counterclockwise external force P60, the shaft 120 receives a downward reaction force P61 in the first contact portion 115. Further, the shaft 120 receives the reaction force P65 directed toward the rotation center C1 in the second contact portion 117 and the reaction force P56 directed toward the rotation center C1 in the second contact portion 118. The shaft 120 is held by the rotor core 110 by canceling out these forces.

Although the rotor 100 has been described above, the rotor 100 is not limited to the configuration described above. The rotor core 110 may include the inner peripheral portions, the first contact portions, and the second contact portions at least in respective end portions in the extending direction (Z-axis direction) of the through hole 101, and may include a portion separated from the entire circumference of the shaft 120 in an intermediate portion. With the above, the rotor core 110 and the shaft 120 of the rotor 100 are reliably fitted. Further, in the rotor 100, the shaft 120 preferably has a rotationally symmetrical shape with respect to the rotation center C1. With the above, the rotor 100 can suppress the deterioration of the rotation balance.

The configuration of the rotor 100 has been described above. The rotor 100 has a simple shape in which the shaft 120 includes the outer peripheral portions and the flat surface portions. Therefore, the shaft 120 can be processed with high accuracy. Further, the through hole 101 can be formed in the rotor core 110 by stamping, for example. Therefore, the through hole 101 can also be processed with high accuracy. Therefore, according to the present embodiment, it is possible to provide a rotor that suppresses deterioration in quality.

Second Embodiment

Figure 5:
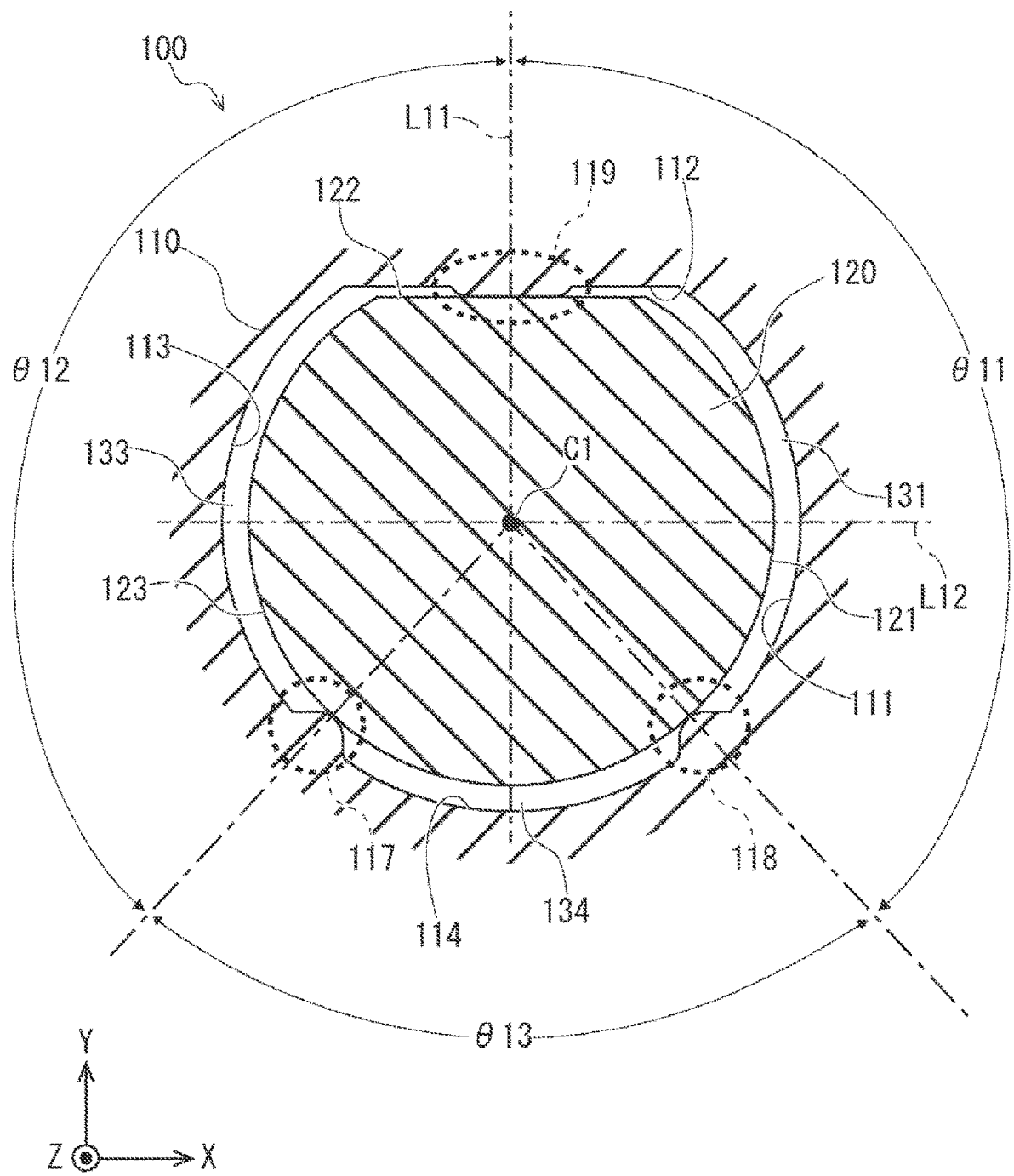
FIG. 5 is a configuration diagram of a rotor according to the second embodiment.

Next, a second embodiment will be described. The second embodiment shows a variation of the above embodiment. In the second embodiment, the shape of shaft 120 and the shape of the first contact portion are different from those in the first embodiment. FIG. 5 is a configuration diagram of the rotor 100 according to the second embodiment.

In the rotor 100 shown in FIG. 5, the rotor core 110 includes a first contact portion 119 so as to straddle the first reference plane L11. The first contact portion 119 is a portion protruding toward the rotation center C1 from the inner peripheral portion 112 that faces and is separated from the flat surface portion 122. The first contact portion 119 contacts the shaft 120 in the central portion of the flat surface portion 122 and supports the shaft 120.

The shaft 120 according to the present embodiment differs from the first embodiment in that the shaft 120 does not include a flat surface portion on the lower side in FIG. 5.

That is, in the shaft 120, a portion excluding the flat surface portion 122 is the outer peripheral portion 121. Further, the rotor core 110 according to the present embodiment includes an arc shaped inner peripheral portion 114 corresponding to the shape of the outer peripheral portion 121 and separated from the outer peripheral portion 121 on the lower side in FIG. 5. With such a shape, the rotor 100 is provided with a well-balanced space portion with the rotation center C1 as a reference. This also suppresses the rotor 100 from deteriorating in weight balance when the rotor 100 rotates.

In the present embodiment, in the first contact portion 119, the second contact portion 117, and the second contact portion 118, the angles θ11, θ12, and θ13 formed by straight lines connecting the points of contact with the shaft 120 and the rotation center C1 are preferably 100 to 140 degrees, for example. With such a configuration, the rotor core 110 can hold the shaft 120 with good balance.

Note that the first contact portion 119 of the rotor core 110 may have a shape that contacts the shaft 120 over the entire flat surface portion 122 or a shape that contacts part of the flat surface portion 122. The rotor core 110 may have the first contact portions 119 at two locations across the first reference plane L11. That is, the rotor core 110 according to the second embodiment may have the first contact portion 115 and the first contact portion 116 instead of the first contact portion 119. The shape of the first contact portion 119 is preferably symmetrical with respect to the first reference plane L11. With the above, the rotor core 110 and the shaft 120 are fitted with good balance.

As described above, according to the present embodiment, it is possible to provide a rotor that suppresses deterioration in quality. Although the present disclosure has been described with reference to the embodiments, the present disclosure is not limited to the above. Various changes that can be understood by those skilled in the art can be made to the configuration and details of the present disclosure within the scope of the disclosure.

What is claimed is:

1. A rotor comprising:
a rotor core provided with a through hole; and
a shaft fitted into the through hole, wherein:
the shaft includes an arc-shaped outer peripheral portion extending along a center of the through hole, and a flat surface portion linearly cutting out at least part of a circle of the outer peripheral portion in a section orthogonal to an extending direction of the center;
the through hole of the rotor core includes an inner peripheral portion that faces and is separated from the outer peripheral portion and the flat surface portion to provide a space portion, at least one first contact portion that is provided in the inner peripheral portion and directed toward the center and contacts the flat surface portion, and two or more second contact portions that are provided in the inner peripheral portion and directed toward the center at positions away from the first contact portion and contact the outer peripheral portion; and
the rotor core includes the first contact portion and the second contact portions at respective positions symmetrical with respect to a first reference plane that is orthogonal to the flat surface portion and extends through the center, and a second reference plane extending through the center and being orthogonal to the first reference plane between the first contact portion and the second contact portions.

2. The rotor according to claim 1, wherein the rotor core includes the first contact portion at each of two locations across the first reference plane.

3. The rotor according to claim 1, wherein the shaft has a rotationally symmetrical shape with respect to the center.

* * * * *